United States Patent
Koizumi

(10) Patent No.: US 10,504,543 B1
(45) Date of Patent: Dec. 10, 2019

(54) MAGNETIC DISK DEVICE

(71) Applicants: Kabushiki Kaisha Toshiba, Minato-ku, Tokyo (JP); Toshiba Electronic Devices & Storage Corporation, Minato-ku, Tokyo (JP)

(72) Inventor: Gaku Koizumi, Yokohama Kanagawa (JP)

(73) Assignees: Kabushiki Kaisha Toshiba, Tokyo (JP); Toshiba Electronic Devices & Storage Corporation, Tokyo (JP)

(*) Notice: Subject to any disclaimer, the term of this patent is extended or adjusted under 35 U.S.C. 154(b) by 0 days.

(21) Appl. No.: 16/247,821

(22) Filed: Jan. 15, 2019

(30) Foreign Application Priority Data

Aug. 24, 2018 (JP) .................. 2018-157373

(51) Int. Cl.
    G11B 5/00       (2006.01)
    G11B 20/10      (2006.01)
    G11B 5/127      (2006.01)
    G11B 5/31       (2006.01)

(52) U.S. Cl.
    CPC ............ *G11B 5/1278* (2013.01); *G11B 5/315* (2013.01); *G11B 5/3116* (2013.01); *G11B 2005/0005* (2013.01)

(58) Field of Classification Search
    CPC ....... G11B 5/00; G11B 5/02; G11B 20/10009; G11B 27/36; G11B 5/09; G11B 20/12; G11B 20/18; G11B 5/54; G11B 5/59633; G11B 5/59638; G11B 2005/0021; G11B 2005/0005; G11B 5/324; G11B 5/4907; G11B 5/2452
    USPC ................ 360/25, 31, 39, 48, 53, 59, 55, 75
    See application file for complete search history.

(56) References Cited

U.S. PATENT DOCUMENTS

| | | | |
|---|---|---|---|
| 8,810,954 B1 | 8/2014 | Taguchi et al. | |
| 9,019,660 B2 | 4/2015 | Funayama | |
| 9,870,789 B2 | 1/2018 | Funayama | |
| 9,881,637 B1* | 1/2018 | Wilson ..................... | G11B 5/02 |

FOREIGN PATENT DOCUMENTS

| | | |
|---|---|---|
| JP | 2012-14792 A | 1/2012 |
| JP | 2014-86122 A | 5/2014 |

* cited by examiner

*Primary Examiner* — Nabil Z Hindi
(74) *Attorney, Agent, or Firm* — White & Case LLP

(57) ABSTRACT

According to one embodiment, a magnetic disk device includes a magnetic disk, a recording head and a controller configured to control the recording head. The recording head includes a high-frequency oscillator disposed in a write gap formed between a main magnetic pole and a return magnetic pole, and a bias voltage application circuit configured to apply a bias voltage to the high-frequency oscillator. The controller includes a bias voltage controller configured to change a bias voltage to be applied to the high-frequency oscillator in accordance with a sampling frequency of data before the data is recorded on the magnetic disk by the recording head.

20 Claims, 12 Drawing Sheets

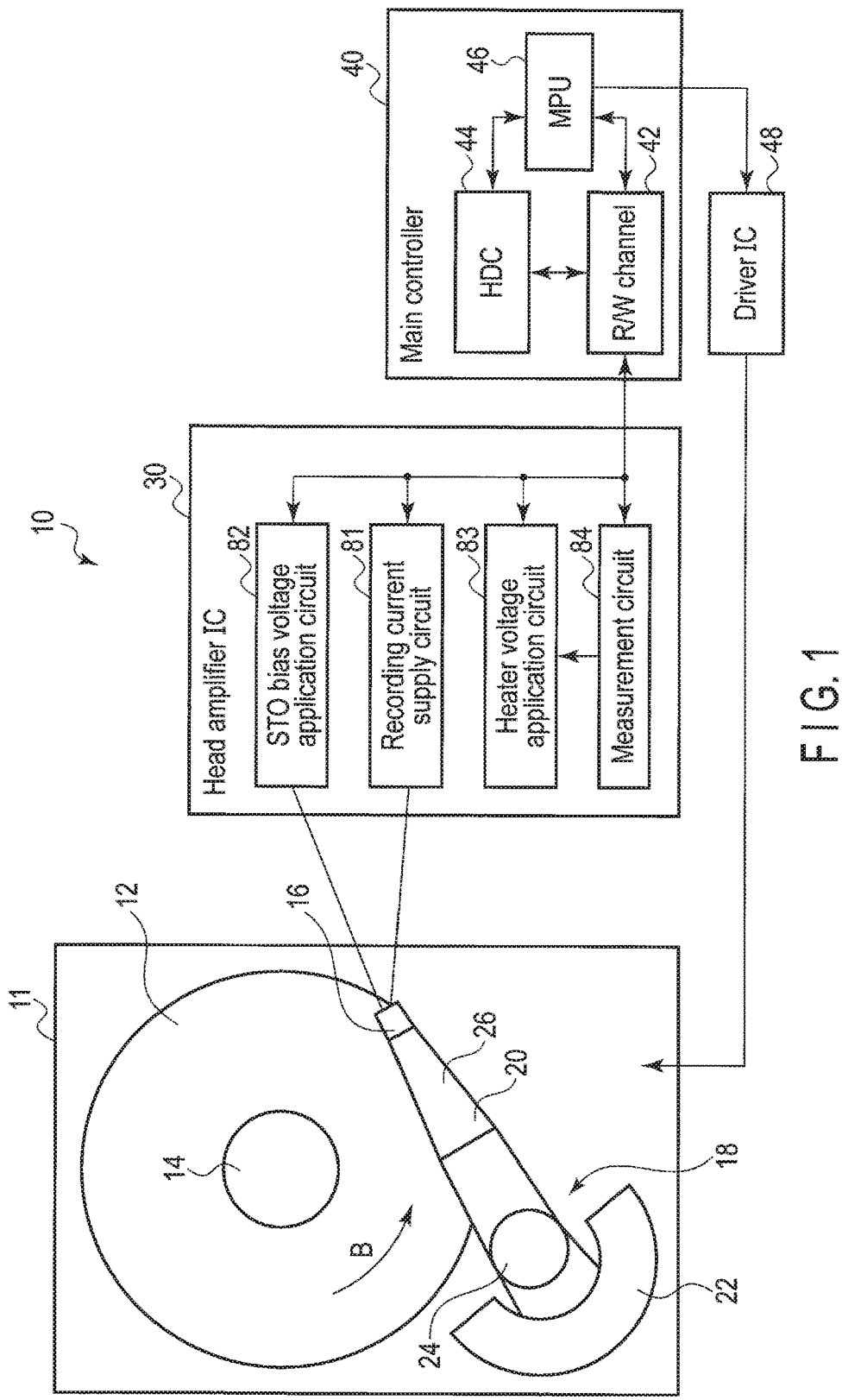
F I G. 1

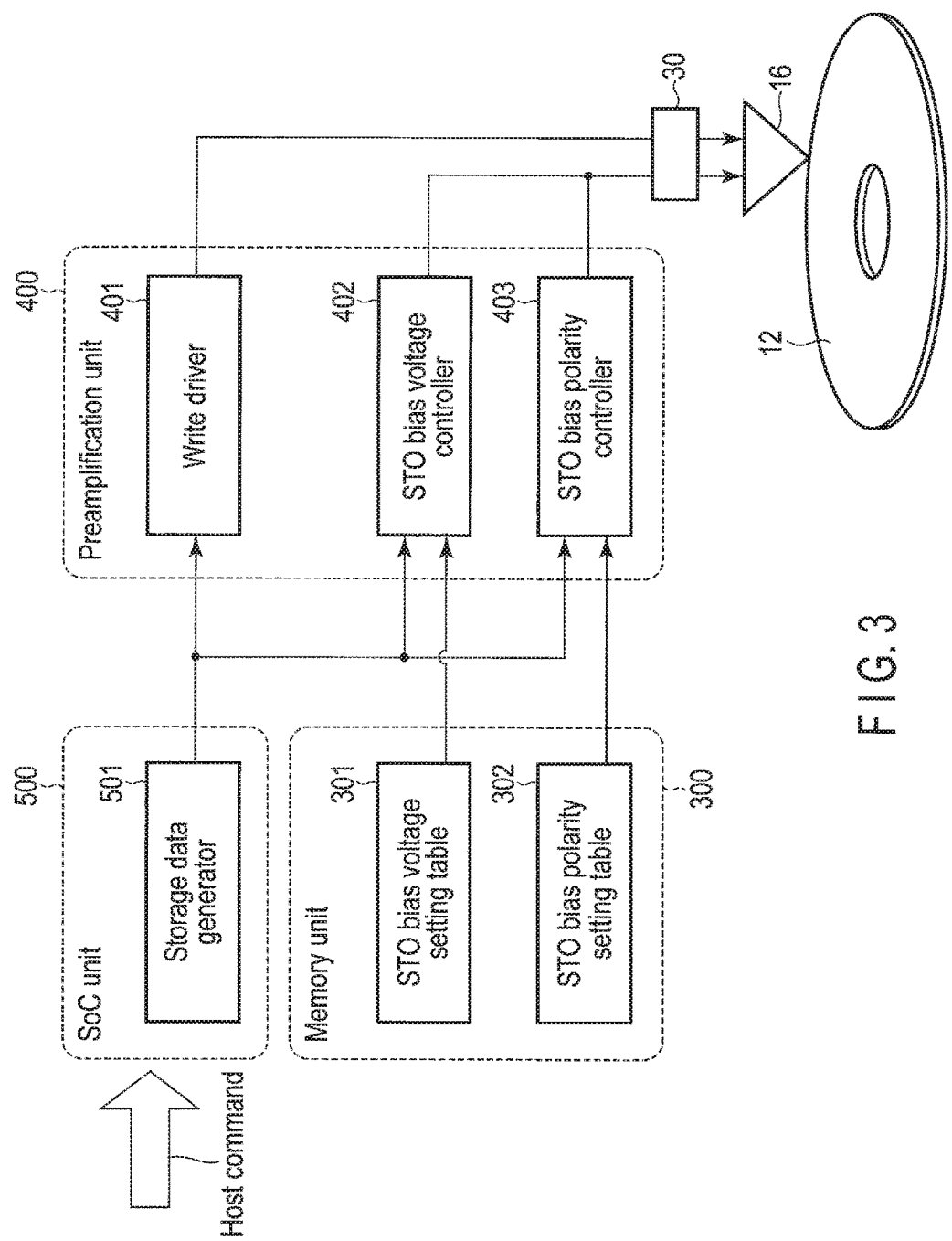
F I G. 3

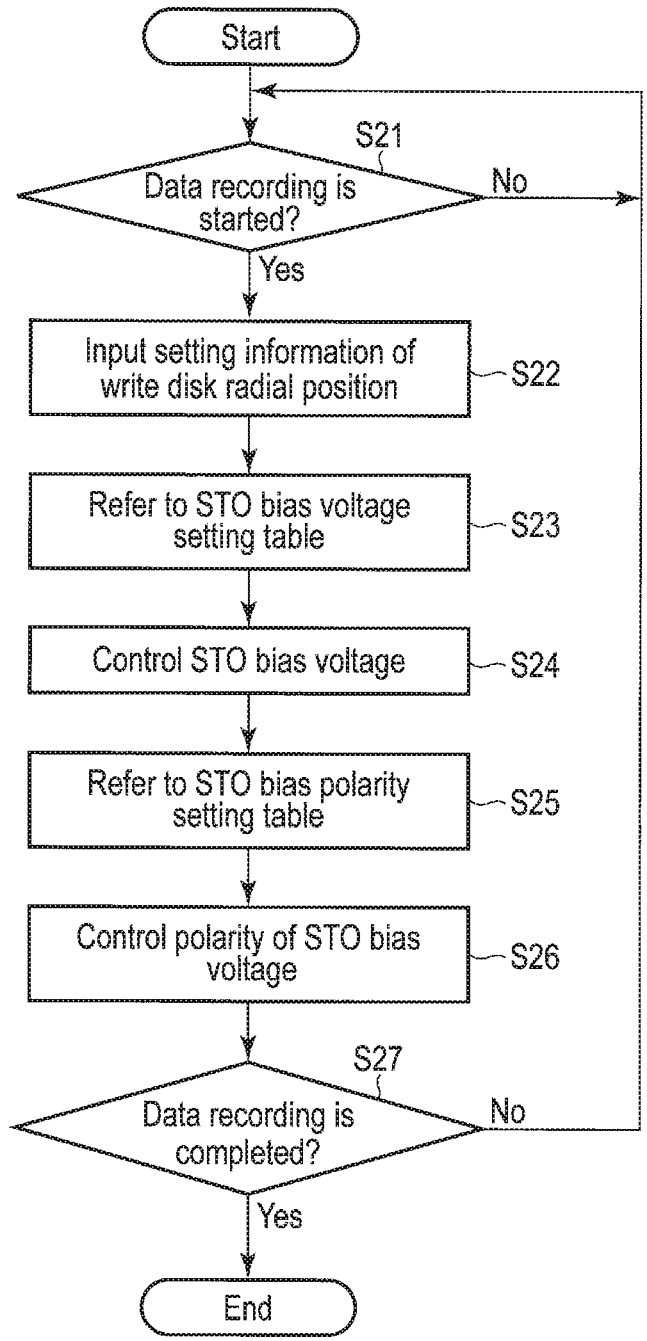
F I G. 10

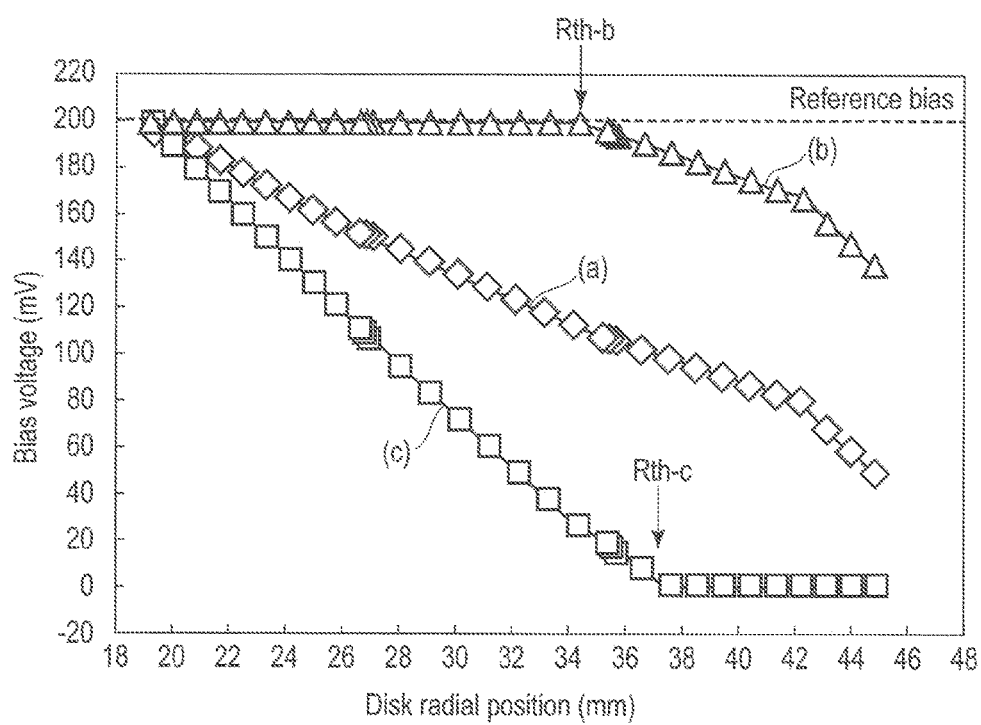
F I G. 11

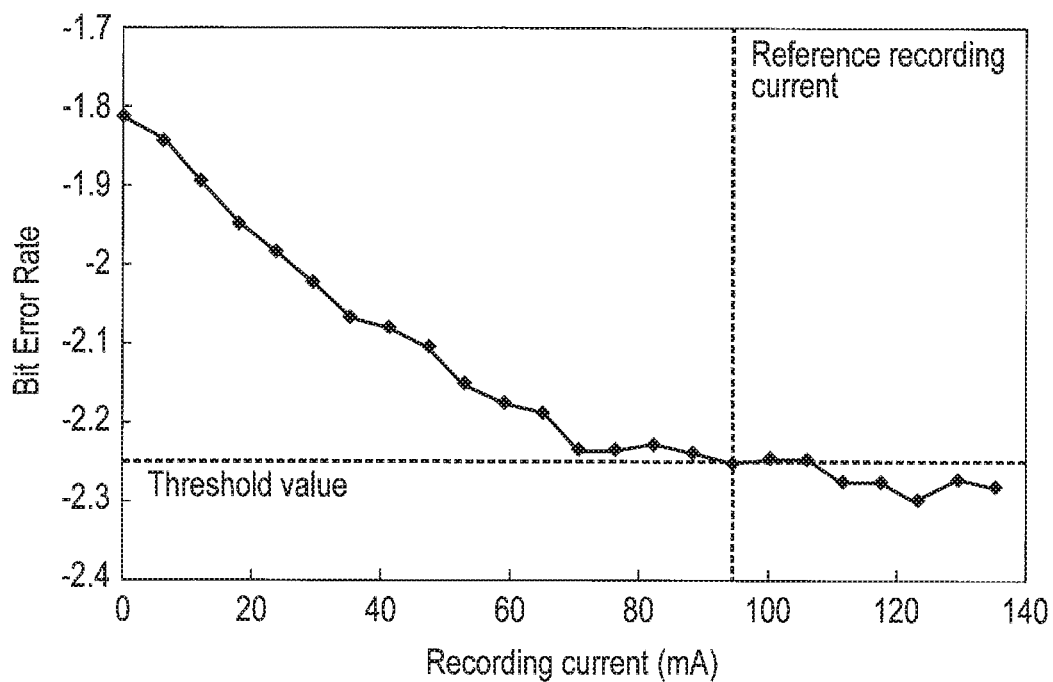
F I G. 14A
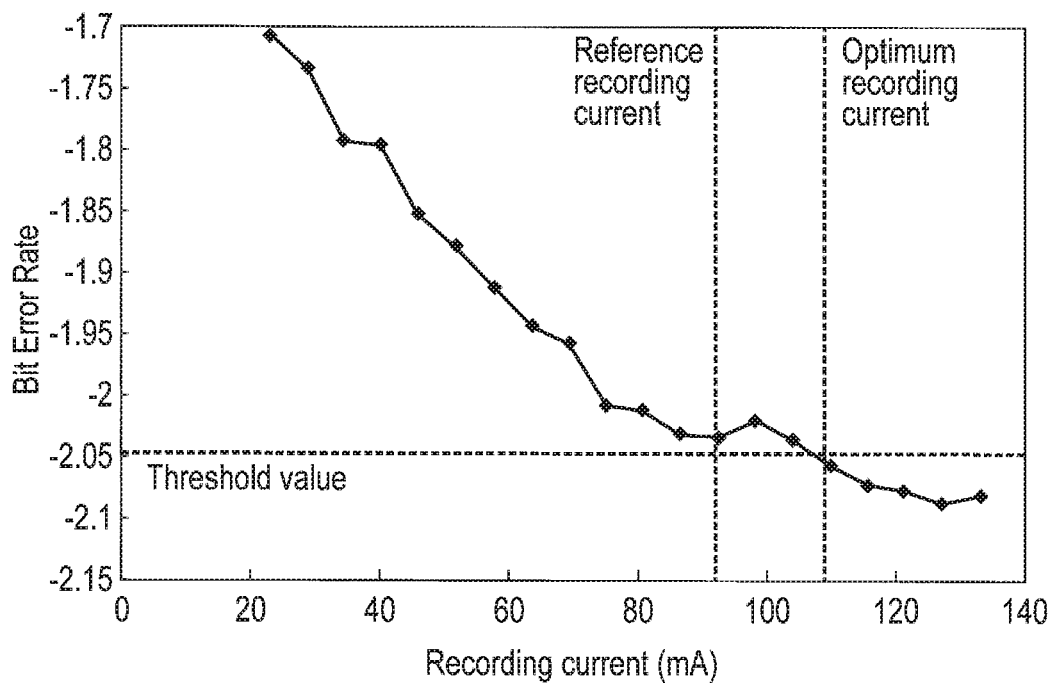
F I G. 14B

US 10,504,543 B1

MAGNETIC DISK DEVICE

CROSS-REFERENCE TO RELATED APPLICATIONS

This application is based upon and claims the benefit of priority from Japanese Patent Application No. 2018-157373, filed Aug. 24, 2018, the entire contents of which are incorporated herein by reference.

FIELD

Embodiments described herein relate generally to a magnetic disk device using a perpendicular magnetic recording head.

BACKGROUND

Recently, a perpendicular magnetic recording system has been adopted in magnetic disk devices to increase their recording density and capacity. In the magnetic disk devices of this system, a recording head for perpendicular magnetic recording is opposed to the recording surface of a magnetic disk having a recording layer for perpendicular magnetic recording. With the recording head, data is recorded in a predetermined area of the magnetic disk by producing a perpendicular-direction magnetic field corresponding to the data to be recorded.

The recording head has a narrowed portion made of soft magnetism metal and includes a main magnetic pole that generates a magnetic field in the perpendicular direction, a return magnetic pole opposed to the main magnetic pole with a write gap therebetween to return magnetic flux from the main magnetic pole and form a magnetic circuit together with the main magnetic pole, and a coil that excites magnetic flux in the magnetic circuit formed by the main magnetic pole and the return magnetic pole to generate a recording magnetic field.

The recording head so configured also includes a high-frequency oscillator, for example a spin torque oscillator (STO) in the write gap to improve recording capability.

When the sampling frequency of recording data increases, the oscillation responsiveness of the high-frequency oscillator becomes insufficient and thus the high-frequency oscillator cannot be brought into a stable oscillation state within a 1-bit time length of the data. Consequently, when data of high sampling frequency is recorded, the oscillation of the high-frequency oscillator becomes unstable to interfere in an adjacent track and cause the adjacent track to deteriorate in quality.

Embodiments described herein aim to provide a magnetic disk device capable of suppressing deterioration of signal quality of an adjacent track due to the oscillation responsiveness of a high-frequency oscillator and improving the signal quality and the recording density.

BRIEF DESCRIPTION OF THE DRAWINGS

FIG. 1 is a block diagram schematically showing a magnetic disk device (HDD) according to a first embodiment.

FIG. 3 is a block diagram showing a system that controls STO bias voltage and polarity in accordance with a data sampling frequency in the first embodiment.

FIG. 10 is a flowchart showing a process of controlling STO bias voltage and polarity in accordance with the radial position of a write disk in a second embodiment.

FIG. 11 is a characteristic graph showing an example of setting an STO bias voltage corresponding to the radial position of the write disk in the second embodiment.

FIGS. 14A and 14B are characteristic graphs showing their respective recording current dependencies of bit error rate in a fourth embodiment.

DETAILED DESCRIPTION

Figure 2:
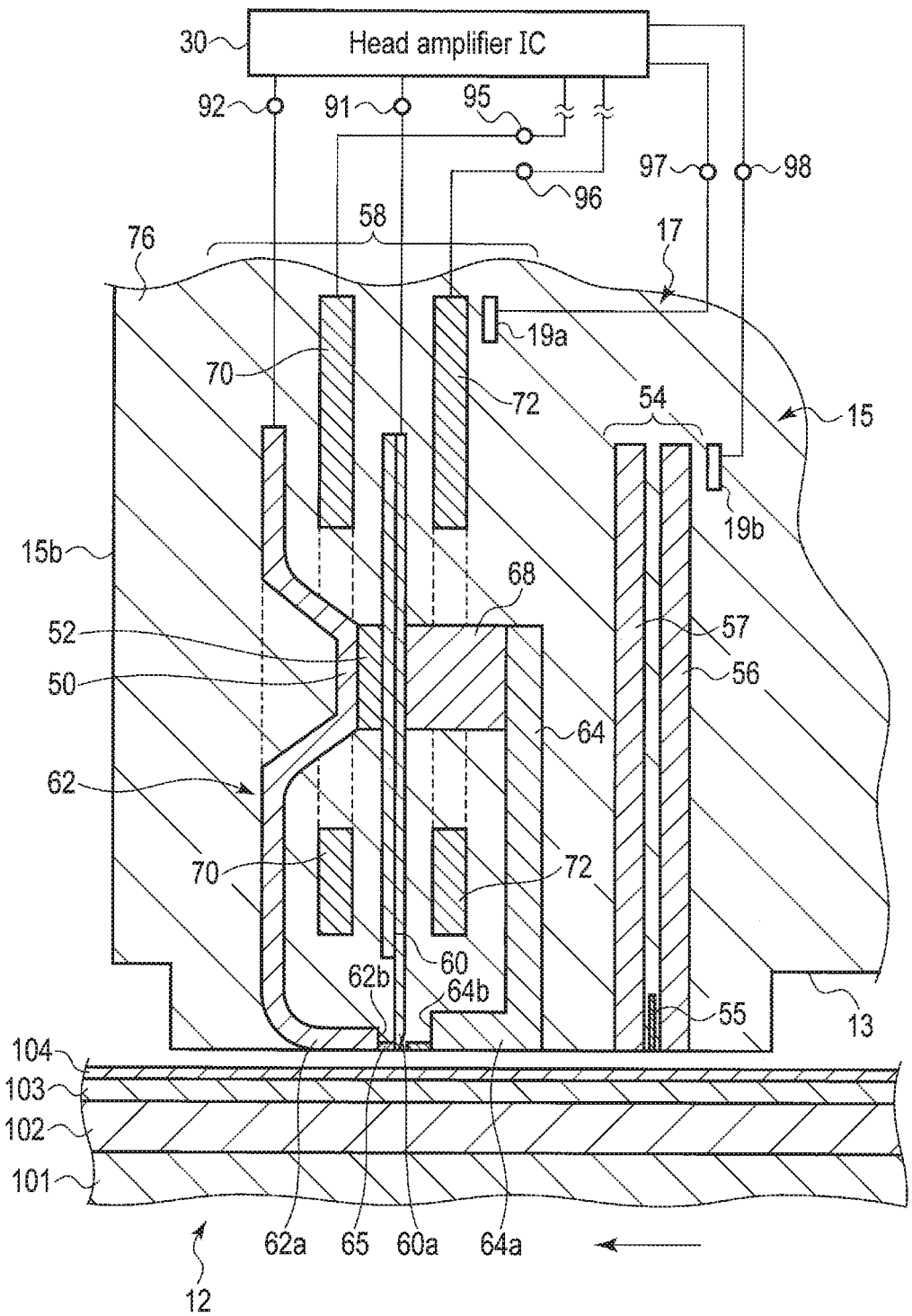
FIG. 2 is a partially enlarged sectional view schematically showing a head portion of a magnetic head and a magnetic disk in the HDD according to the first embodiment.

Embodiments will be described hereinafter with reference to the accompanying drawings.

In general, according to one embodiment, a magnetic disk device includes a magnetic disk having a recording layer, a recording head configured to apply a recording magnetic field to the recording layer and a controller configured to control the recording head. The recording head includes a main magnetic pole configured to generate the recording magnetic field, a return magnetic pole opposed to a tip portion of the main magnetic pole with a write gap therebetween, a recording coil configured to excite magnetic flux in a magnetic circuit formed by the main magnetic pole and the return magnetic pole, a high-frequency oscillator disposed in the write gap and a bias voltage application circuit configured to apply a bias voltage to the high-frequency oscillator through the main magnetic pole and the return magnetic pole. The controller includes a bias voltage controller configured to change a bias voltage to be applied to the high-frequency oscillator in accordance with a sampling frequency of data before the data is recorded on the magnetic disk by the recording head.

The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes, etc., of the respective parts are illustrated schematically in the drawings, rather than as an accurate representation of what is implemented. However, such schematic illustration is merely exemplary, and in no way restricts the interpretation of the invention. In addition, in the specification and drawings, the same elements as those described in connection with preceding drawings are denoted by like reference numbers, and detailed description thereof is omitted unless necessary.

First Embodiment

The configuration of a magnetic disk device (a hard disk drive that will be referred to as an HDD 10 hereinafter) according to a first embodiment will be described with reference to FIGS. 1 and 2. FIG. 1 is a block diagram schematically showing the HDD 10. FIG. 2 is a partially enlarged sectional view schematically showing a head portion of a magnetic head and a magnetic disk. FIG. 3 is a block diagram showing a control system that controls a bias voltage (referred to as an STO bias voltage hereinafter) to drive an STO.

As shown in FIG. 1, the HDD 10 includes a rectangular casing 11, a magnetic disk 12 provided in the casing 11 as a recording medium, a spindle motor 14 that supports and rotates the magnetic disk 12, and a plurality of magnetic heads 16 that writes and reads data to and from the magnetic disk 12. The HDD 10 also includes a head actuator 18 that moves the magnetic heads 16 onto a given track on the magnetic disk 12 and positions them thereon. The head actuator 18 includes a suspension assembly 20 that movably supports the magnetic heads 16 and a voice coil motor (VCM) 22 that rotates the suspension assembly 20.

The HDD 10 includes a head amplifier IC 30, a main controller 40 and a driver IC 48. The head amplifier IC 30 is, for example, provided in the suspension assembly 20 and electrically connected to the magnetic heads 16. The main controller 40 and driver IC 48 are formed on, for example, a control circuit board (not shown) provided on the back of the casing 11. The main controller 40 includes an R/W channel 42, a hard disk controller (HDC) 44 and a microprocessor (MPU) 46. The main controller 40 is electrically connected to the head amplifier IC 30 and also electrically connected to the VCM 22 and the spindle motor 14 via the driver IC 48. The HDD 10 can be connected to a host computer (not shown).

The magnetic disk 12 is a perpendicular magnetic recording medium with a recording layer having anisotropy in a direction perpendicular to the surface of the magnetic disk. Specifically, the magnetic disk 12 includes a substrate 101 that is formed of a nonmagnetic body shaped like a circular disc whose diameter is, for example, about 2.5 inches (6.35 cm).

The suspension assembly 20 includes a bearing section 24 rotatably fixed to the casing 11 and a plurality of suspensions 26 extending from the bearing section 24. The magnetic heads 16 are supported at their respective extending ends of the suspensions 26. The magnetic heads 16 are electrically connected to the head amplifier IC 30 via an interconnect member provided in the suspension assembly 20.

The configuration of the magnetic heads 16 will be described in detail below.

As shown in FIG. 2, each of the magnetic heads 16 is configured as a flying head and includes a slider 15 shaped almost like a rectangular parallelopiped and a head section 17 formed at an outflow end (trailing end) of the slider 15. The slider 15 is formed of, for example, a sintered body of alumina and titanium carbide (AlTiC) and the head section 17 is formed by a plurality of thin films.

The slider 15 includes a rectangular air bearing surface (ABS) 13 opposed to the surface of the magnetic disk 12. The slider 15 remains floated by a predetermined amount from the surface of the magnetic disk 12 by an air flow produced between the surface of the magnetic disk 12 and the ABS 43 by the rotation of the magnetic disk 12. The direction of the airflow coincides with the direction of rotation of the magnetic disk 12. The slider 15 includes a leading end 15a located on the inflow side of the air flow and a trailing end 15b located on the outflow side of the air flow.

The head section 17 is a separate magnetic head including a reproduction head 54 and a recording head 58 formed at the trailing end 15b of the slider 15 by a thin film process. In order to control the recording/reproduction floating amount of the head section 17, a recording heater 19a is disposed on the depth side of the recording head 58 and a reproduction heater 19b is disposed on the depth side of the reproduction head 54.

The reproduction head 54 is configured by a reproduction element 55 of a magnetic film that exhibits a magnetoresistive effect and upper and lower shields 56 and 57 of shield films arranged at the trailing and leading sides of the reproduction element 55 to sandwich the magnetic film 55. The lower ends of the reproduction element 55 and the upper and lower shields 56 and 57 are exposed to the ABS 13 of the slider 15. The reproduction head 54 is connected to the head amplifier IC 30 via an electrode (not shown), an interconnect (not shown) and an interconnect member 28 to output the read data to the head amplifier IC 30.

The recording head 58 is provided on the side of the trailing end 15b of the slider 15 with respect to the reproduction head 54. The recording head 58 includes a main magnetic pole 60 made of high magnetic permeability material that generates a recording magnetic field in a direction perpendicular to the surface of the magnetic disk 12, a return magnetic pole 62 serving as a trailing shield (write shield, or first shield), and a leading core 64 serving as a leading shield (second shield). The main magnetic pole 60 and return magnetic pole 62 constitute a first magnetic core that forms a magnetic path, and the main magnetic pole 60 and leading core 64 constitute a second magnetic core that forms a magnetic path. The recording head 58 includes a first coil (recording coil) 70 wound around the first magnetic core and a second coil (recording coil) 72 wound around the second magnetic core.

The main magnetic pole 60 extends in a direction almost perpendicular to the surface of the magnetic disk 12. The tip portion 60a of the main magnetic pole 60 on the side of the magnetic disk 12 is tapered toward the surface of the disk and its section is shaped like, for example, a trapezoid. The tip end face of the main magnetic pole 60 is exposed to the ABS 13 of the slider 15. The width of a trailing side end face 60b of the tip portion 60a almost corresponds to that of a track in the magnetic disk 12.

The return magnetic pole 62 formed of a soft magnetic body is disposed on the trailing side of the main magnetic pole 60 in order to close the magnetic paths effectively via a soft magnetic layer 102 of the magnetic disk 12 immediately below the main magnetic pole 60. The return magnetic pole 62 is approximately L-shaped and includes a first connecting portion 50 to be connected to the main magnetic pole 60. The first connecting portion 50 is connected to the upper portion of the main magnetic pole 60, or a portion separated from the ABS 13 of the main magnetic pole 60 via a non-conductive body 52.

The tip portion 62a of the return magnetic pole 62 is shaped like an elongated rectangle and its tip end face is exposed to the ABS 13 of the slider 15. The leading side end face 62b of the tip portion 62a extends along the width direction of the tracks of the magnetic disk 12 and also extends in a direction almost perpendicular to the ABS 13. The leading side end face 62b is opposite and almost parallel to the trailing side end face 60b of the main magnetic pole 60 with a write gap WG therebetween.

The first coil 70 is disposed to be wound around a magnetic circuit (first magnetic core) including the main magnetic pole 60 and the return magnetic pole 62. The first coil 70 is wound around, for example, the first connecting portion 50. When a signal is written to the magnetic disk 12, if recording current is caused to flow through the first coil 70, the first coil 70 excites the main magnetic pole 60 to cause magnetic flux to flow through the main magnetic pole 60.

A spin torque oscillator (STO) 65, which is one example of the high-frequency oscillator, is provided between the tip portion 60a of the main magnetic pole 60 and the return magnetic pole 62 in the write gap WG and its part is exposed to the ABS 13. The STO 65 is formed of three layers of a spin injection layer (Pin layer), an intermediate layer and an oscillation layer and is so configured that when an STO voltage is driven, the oscillation layer receives spin torque from the spin injection layer and is oscillated and magnetized.

The lower end face of the STO 65 is not always flush with the ABS 13 but can be separated upwardly in the height direction from the ABS 13. The spin injection layer, intermediate layer and oscillation layer can be so formed that their laminate surfaces or film surfaces are inclined relative to a direction perpendicular to the ABS 13.

Connection terminals 91 and 92 are connected to the main magnetic pole 60 and the return magnetic pole 62, respectively and also connected to the head amplifier IC 30 via an interconnect. Thus, a current circuit is configured to allow current to flow in series from the head amplifier IC 30 through the main magnetic pole 60, STO 65 and return magnetic pole 62. Connection terminals 97 and 98 are connected to the recording heater 19a and the reproduction heater 19b, respectively and also connected to the head amplifier IC 30 via an interconnect.

The leading core 64 formed of a soft magnetic body is provided opposite to the main magnetic pole 60 on the leading side of the main magnetic pole 60. The leading core 64 is approximately L-shaped and its tip portion 64a on the side of the magnetic disk 12 is shaped like an elongated rectangle. The tip end face (lower end face) of the tip portion 64a is exposed to the ABS 13 of the slider 15. The trailing side end face 64b of the tip portion 64a extends along the width direction of tracks of the magnetic disk 12. The trailing side end face 64b is opposed to the leading side end face of the main magnetic pole 60 with a gap therebetween. The gap is covered with a protective insulating film 76 serving as a nonmagnetic body.

The leading core 64 includes a second connecting portion 68 joined to a back gap between the leading core 64 and the main magnetic pole 60 at a position separated from the magnetic disk 12. The second connecting portion 68 is formed of, for example, a soft magnetic body and forms a magnetic circuit together with the main magnetic pole 60 and the leading core 64. The second coil 72 of the recording head 58 is disposed to be wound around a magnetic circuit (second magnetic core) including the main magnetic pole 60 and the leading core 64 to apply a magnetic field to the magnetic circuit. The second coil 72 is wound around, for example, the second connecting portion 68. Note that a non-conductor or a nonmagnetic body can be inserted in part of the second connecting portion 68.

The second coil 72 is wound in a direction opposite to the direction in which the first coil 70 is wound. The first coil 70 and the second coil 72 are connected to their respective terminals 95 and 96, and these terminals 95 and 96 are connected to the head amplifier IC 30 via an interconnect. The second coil 72 can be connected in series with the first coil 70. Furthermore, the first and second coils 70 and 72 may each control the supply of current. The currents supplied to the first and second coils 70 and 72 are controlled by the head amplifier IC 30 and the main controller 40.

The reproduction head 54 and recording head 58 are covered with the protective insulating film 76, excluding a portion of the slider 15 exposed to the ABS 13. The protective insulating film 76 forms an outer shape of the head portion 17.

The head amplifier IC 30 that drives the magnetic head 16 and recording head 58 configured as described above includes, as shown in FIG. 1, a recording current supply circuit 81 that supplies recording current to the first and second coils 70 and 72 via the connecting terminals 95 and 96, an STO bias voltage application circuit 82 that applies an STO bias voltage to the STO 65 via an interconnect (not shown) and the connecting terminals 91 and 92, a heater voltage application circuit 83 that applies a heater voltage to the recording heater 19a and reproduction heater 19b via an interconnect (not shown) and the connecting terminals 97 and 98, and a measurement circuit 84 that measures and compares error rates of data recorded on the magnetic disk 12. The head amplifier IC 30 also includes a timing computation unit (not shown) which controls time and timing at which current is caused to flow through the recording current supply circuit 81 and also controls time and timing at which a voltage is applied to the STO bias voltage application circuit 82 and a recording current waveform generator (not shown) which generates a recording current waveform in response to a recording pattern signal generated from the R/W channel 42.

During the operation of the HDD 10, the main controller 40 drives the spindle motor 14 by the driver IC 48 and rotates the magnetic disk 12 at a given speed under control of the MPU 46. The main controller 40 drives the VCM 22 by the driver IC 48 to move the magnetic head 16 onto a desired track of the magnetic disk 12 and position it thereon.

During the recording, the recording current supply circuit 81 of the head amplifier IC 30 causes recording current (AC) to pass through the first and second coils (referred to as recording coils hereinafter) 70 and 72 in accordance with recording data and recording pattern generated from the R/W channel 42. Thus, the first and second coils 70 and 72 excite the main magnetic pole 60 to generate a recording magnetic field from the main magnetic pole 60. Under control of the MPU 46, the STO bias voltage application circuit 82 applies an STO bias voltage to the main magnetic pole 60 and return magnetic pole 62 to energize the interconnect, connecting terminals 91 and 92, main magnetic pole 60, STO 65 and return magnetic pole 62 in series. Under control of the MPU 46, the heater voltage application circuit 83 and measurement circuit 84 measure a recording data error rate and manages the temperature of the recording heater 19a based upon a result of the measurement.

Figure 4:
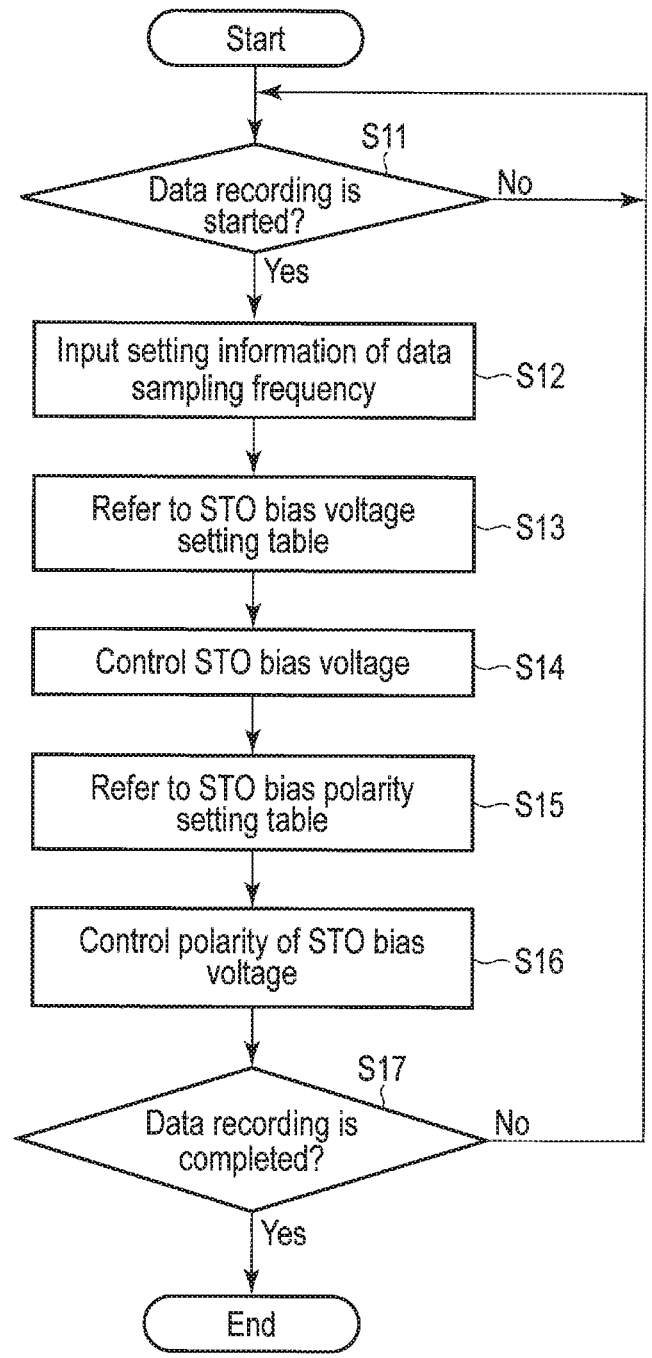
FIG. 4 is a flowchart showing a process of controlling STO bias voltage and polarity in accordance with a data sampling frequency in the first embodiment.

FIG. 3 is a block diagram showing a control system to control a bias voltage when the STO is driven in the first embodiment, and FIG. 4 is a flowchart showing a control process of the control system. The control system shown in FIG. 3 is implemented by a memory unit 300, a preamplification unit 400 and a system-on-chip (SoC) unit 500 in the MPU 46. The memory unit 300 includes an STO bias voltage setting table 301 that tables the relationship between a data sampling frequency and the optimum STO bias voltage and an STO bias polarity setting table 302 that tables the relationship between a data sampling frequency and the polarity of the optimum STO bias voltage. The preamplification unit 400 includes a write driver 401, an STO bias voltage controller 402 and an STO bias polarity controller 403. The SoC unit 500 includes a recording data generator 501. Upon receipt of a data write host command, the recording data generator 501 generates recording data for writing at a data sampling frequency designated by the command and also generates setting information of the data sampling frequency.

More specifically, in the HDD according to the first embodiment, when desired data is recorded in response to a processing command from a host controller (not shown), the recording data generated by the recording data generator 501 in the SoC unit 500 is transmitted to the write driver 401 in the preamplification unit 400. The write driver 401 calculates recording currents to record the recording data on the magnetic disk 12 and supplies the magnetic head 16 with a recording current corresponding to the recording current supply circuit 81 of the head amplifier IC 30. Data is thus recorded on a recording layer of the magnetic disk 12.

In the case of data recording, the STO bias voltage is controlled as shown in FIG. 4. First, in the preamplification unit 400, when direction of data recording start are received (step S11), the preamplification unit 400 receives setting information of a data sampling frequency to be generated when recording data is generated, from the SoC unit 500 and transfers it to the STO bias voltage controller 402 and STO bias polarity controller 403 (step S12). Upon receiving the setting information of a data sampling frequency, the STO bias voltage controller 402 refers to the STO bias voltage setting table 301 (step S13), reads out an STO bias voltage corresponding to the sampling frequency of recording data, and controls the STO bias voltage application circuit 82 to change the STO bias voltage (step S14). Similarly, upon receiving the setting information of a data sampling frequency, the STO bias polarity controller 403 refers to the STO bias polarity setting table 302 (step S15), reads out polarity of the STO bias voltage corresponding to the sampling frequency of recording data, and controls the STO bias voltage application circuit 82 to change the STO bias voltage of the polarity (step S16). After that, a series of processes is repeated until data recording is completed (step S17). Therefore, under the condition of a high data sampling frequency at which an inhibition influence is easily caused on an adjacent track due to the oscillation responsiveness of the STO 65, the STO bias voltage can be optimized and accordingly the inhibition influence can be reduced.

Below is one example of STO bias control in the first embodiment.

Figure 5:
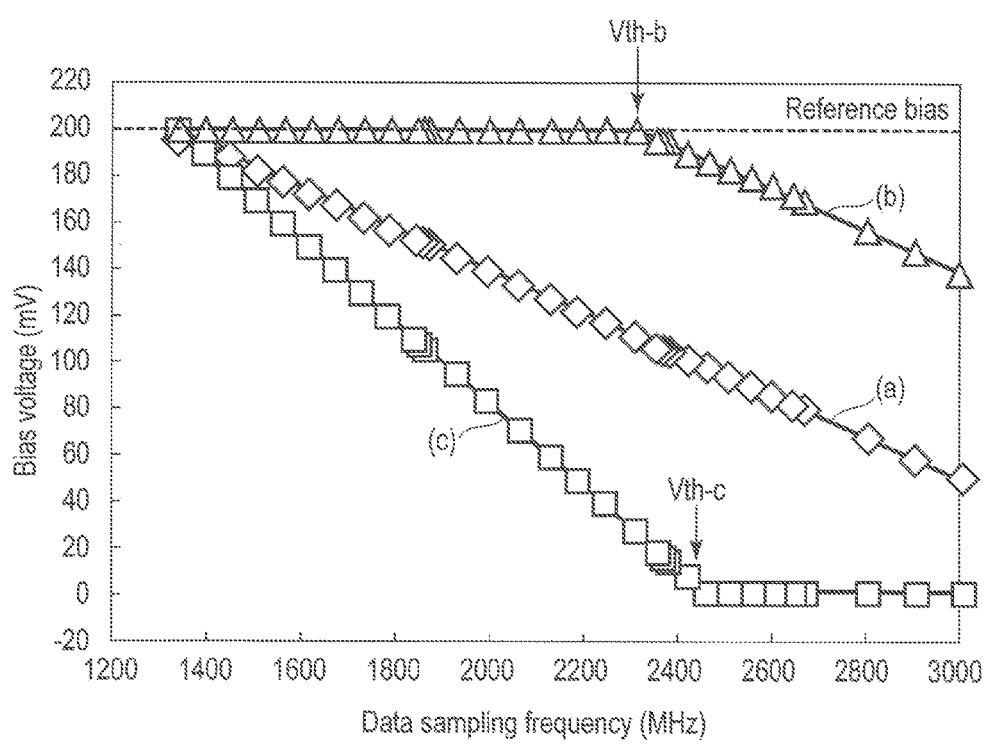
FIG. 5 is a characteristic graph showing an example of setting an STO bias voltage in accordance with a data sampling frequency in the first embodiment.

In FIG. 5, characteristics (a) to (c) each represent an example of setting an STO bias voltage to the data sampling frequency. As described above, an inhibition influence is caused due to oscillation responsiveness with the increase of the data sampling frequency. It is thus desirable to suppress the STO bias voltage as the data sampling frequency becomes higher. As a method for the suppression, for example, it is considered that the bias voltage is lowered uniquely relative to the reference bias as the data sampling frequency increases, as represented as, e.g., characteristic (a) in FIG. 5.

On the other hand, it is considered that the above inhibition influence due to oscillation responsiveness is not caused unless the frequency is a given frequency or higher. It is thus considered that in a frequency domain of a predetermined frequency (threshold value Vth-b) or higher as represented as, e.g., characteristic (b) in FIG. 5, the bias voltage is lowered uniquely relative to the reference bias in accordance with the frequency. When the inhibition influence due to oscillation responsiveness is great to the contrary, it may be desirable not to apply a bias voltage when the frequency is a given frequency (threshold value Vth-c) or higher. It is thus considered that the bias voltage is lowered uniquely relative to the reference bias in accordance with the frequency in a frequency domain of threshold value Vth-c or lower as represented as characteristic (c) in FIG. 5 and the application of the bias voltage is turned off in a frequency domain of threshold value Vth-c or higher.

Figure 6A:
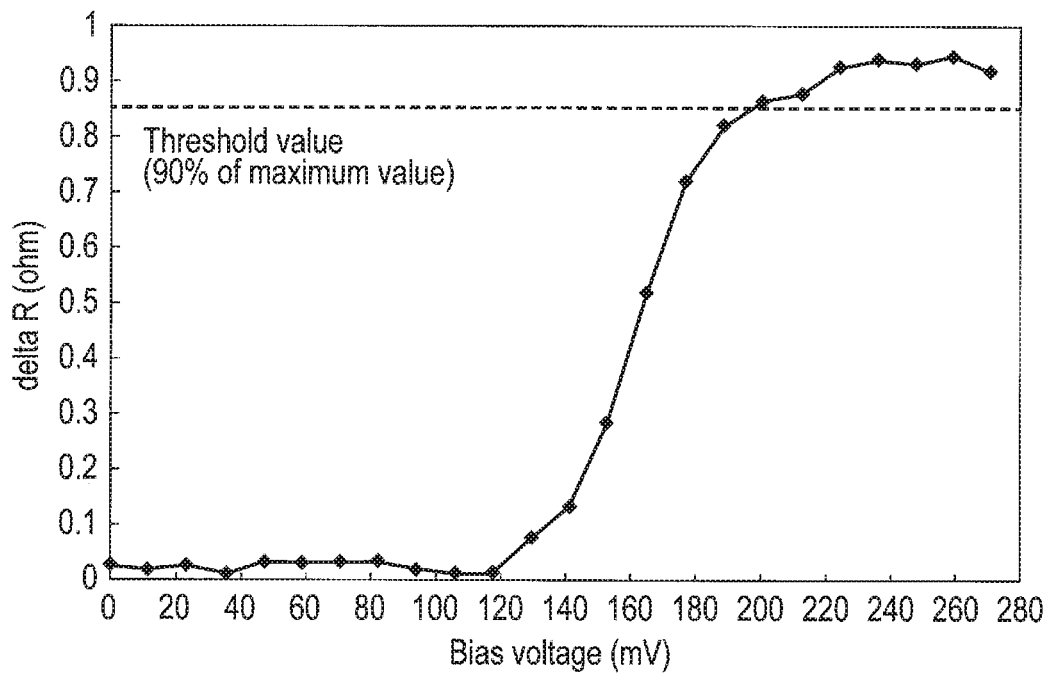
FIGS. 6A and 6B are characteristic graphs showing their respective bias dependencies of delta R and delta OW in the first embodiment.
Figure 6B:
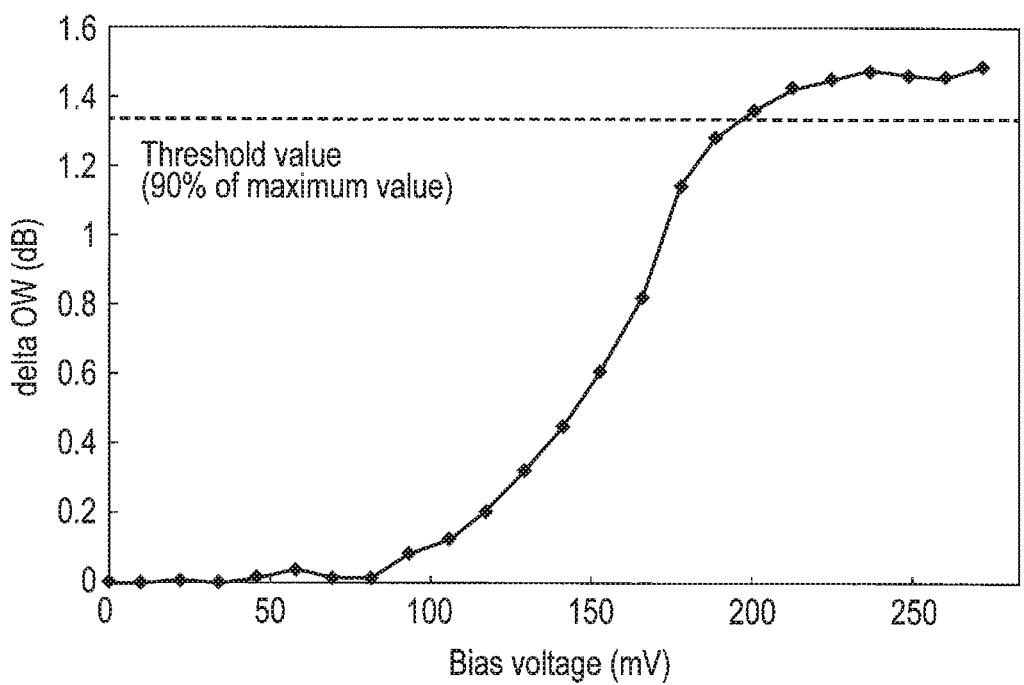

When a difference absolute value between an STO resistance value at the time of application of a bias voltage to a polarity at which the STO oscillates and an STO resistance value at the time of application of a bias voltage to a polarity opposite to that in the oscillation direction is delta R as shown in, e.g., FIG. 6A, the reference bias can be confirmed by measuring the difference absolute value delta R with the increase of the absolute value of the bias voltage. For example, as shown in FIG. 6A, the bias voltage value obtained when the difference absolute value delta R has reached 90% of the maximum value thereof, has only to be defined as a reference bias. Alternatively, as shown in FIG. 6B, when a difference absolute value between an overwrite characteristic at the time of application of a bias voltage to a polarity at which the STO oscillates and an overwrite characteristic at the time of application of a bias voltage to a polarity opposite to that in the oscillation direction is defined as delta OW, the delta OW is measured with the increase of the absolute value of the bias voltage and, for example, the bias voltage obtained when the delta OW has reached 90% of the maximum value thereof, has only to be defined as a reference bias.

Figure 7:
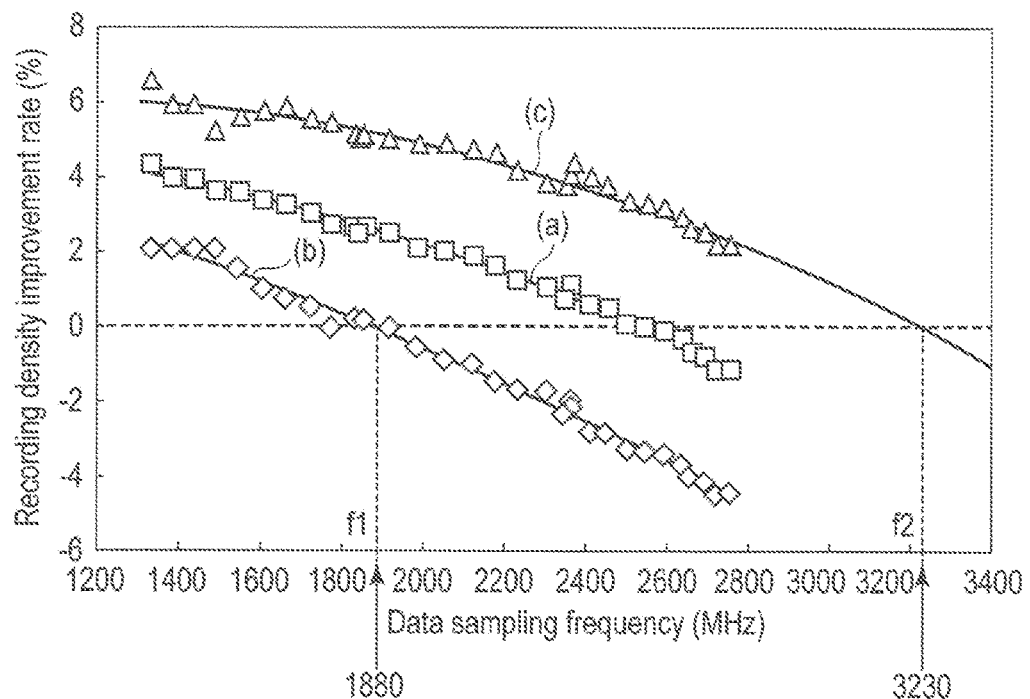
FIG. 7 is a characteristic graph showing data frequency dependency of the rate of improvement in recording density at the time of application of STO bias voltage in the first embodiment.

A specific assumed range of the foregoing frequency threshold values Vth-b and Vth-c is inferred from the results of recording density improvement rate with respect to the data sampling frequency at the time of application of a predetermined STO bias voltage, as shown in FIG. 7. The inhibition influence on an adjacent track due to responsiveness of the STO tends to deteriorate the recording density improvement rate as the data sampling frequency becomes higher. It is seen that the sampling frequency at which the improvement rate is less than 0% and the recording density is lowered, is approximately 1880 MHz or higher and 3230 MHz or lower within a f1 to f2 range of the average value ±1σ (characteristic (a) is an average value, characteristic (b) is −1σ and characteristic (c) is +=1σ). This frequency has only to be the foregoing frequency threshold values Vth-b and Vth-c.

As described above, the STO bias voltage is adjusted according to the data sampling frequency to make it possible to reduce the inhibition influence due to responsiveness of the STO. It is effective to adjust the STO bias voltage to suppress the peak value of the recording current according to the data sampling frequency and lengthen the rise time of the recording current according to the data sampling frequency.

Figure 8:
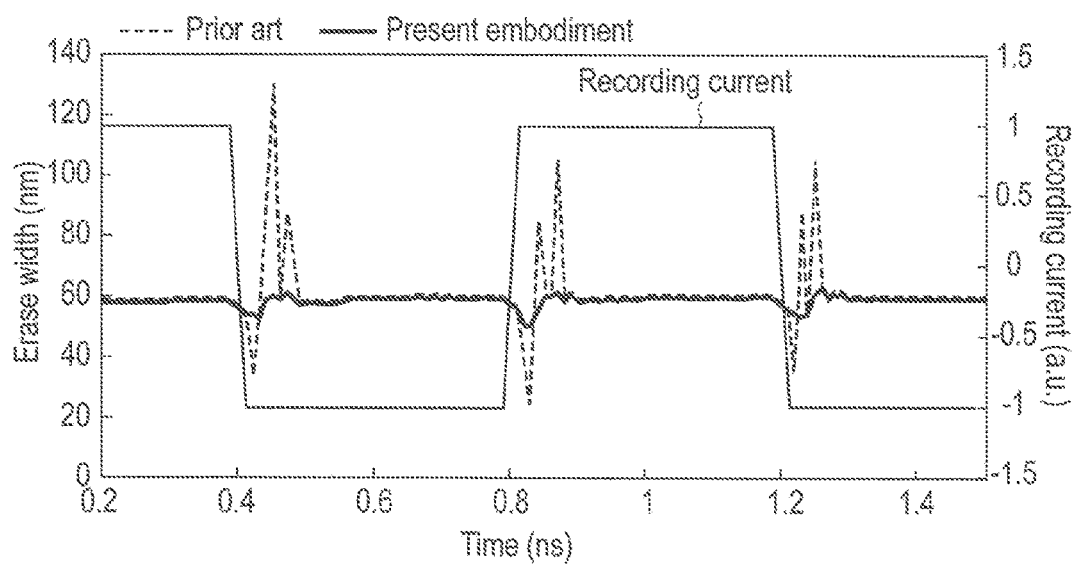
FIG. 8 is a waveform chart illustrating an effect of reducing an erase width by reversing recording current in the first embodiment.

Below is a description of advantages to be produced from the first embodiment. FIG. 8 shows time variations of the width of interference with an adjacent track (erase width) at the time of recording of data of 2.5 GHz data sampling frequency. In FIG. 8, the solid line indicates the first embodiment and the dotted line indicates the prior art. When a fixed bias voltage is applied irrespective of the data sampling frequency as indicated by the dotted line (prior art), an electric field leaks widely from the main magnetic pole due to the influence of a delay of STO oscillation responsiveness to a recording main magnetic pole immediately after the polarity of recording data is reversed. At that moment, the erase width greatly increases to deteriorate the quality of adjacent data. In the first embodiment, when a bias voltage is lowered according to the frequency to suppress the influence of the STO oscillation as indicated by the solid line, the erase width can be prevented from increasing extremely even immediately after the polarity of recording data is reversed as shown in FIG. 8.

Figure 9:
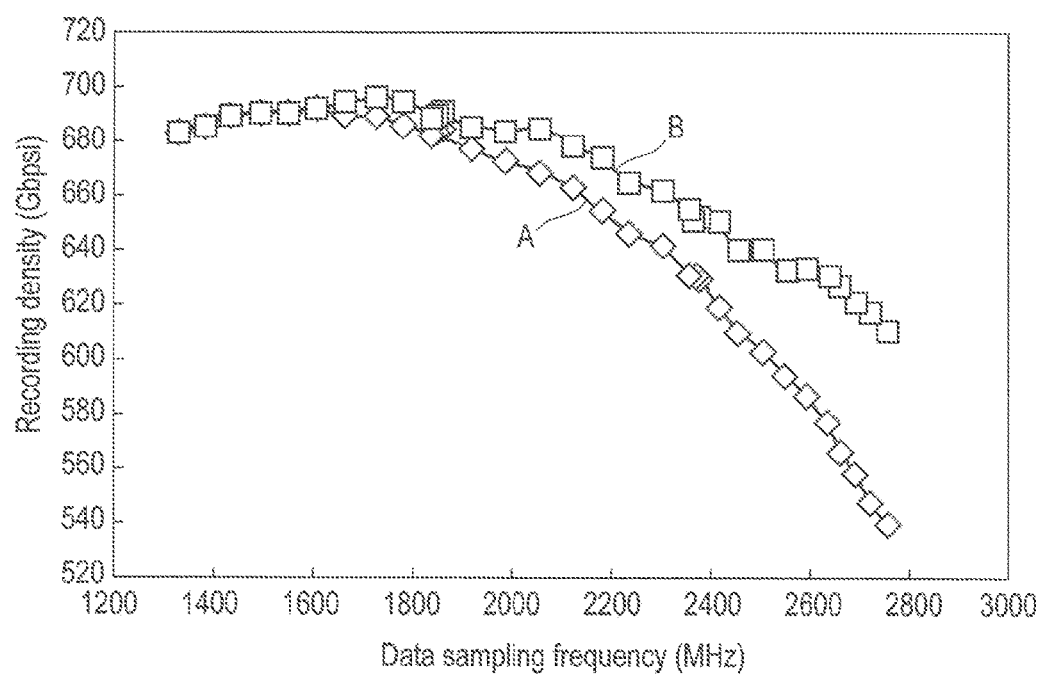
FIG. 9 is a characteristic graph showing an effect of improving in recording density in the first embodiment.

FIG. 9 shows results of measurement of recording density that is attainable when the data sampling frequency is increased. In FIG. 9, A indicates characteristic of recording density that the first embodiment is not applied and B indicates characteristic of recording density that the first embodiment is applied. If the first embodiment is not applied, represented as characteristic A in FIG. 9, the inhibition influence due to oscillation responsiveness is small and not problematic in a low data sampling frequency domain, but the recording density capable of reading and writing will be lowered by the inhibition influence due to oscillation responsiveness in a high data sampling frequency domain. In contrast, if the first embodiment is applied, the bias voltage is lowered in accordance with the data sampling frequency to reduce the influence of STO oscillation, with the result that the decrease in recording density due to the increase in frequency can be mitigated as represented as characteristic B in FIG. 9, thus improving in recording density.

As described above, in the magnetic disk device according to the first embodiment, in a high data sampling frequency domain where the inhibition influence on an adjacent track due to STO oscillation responsiveness is easy to occur, the setting of the STO bias voltage can be optimized and thus the inhibition influence can be reduced.

Second Embodiment

In the first embodiment, a bias voltage is controlled in accordance with the sampling frequency of recording data. The recording data sampling frequency is adjusted based upon the radial position of a magnetic disk. It is thus understood that the control of a bias voltage at a sampling frequency of recording data is equivalent to the control of a bias voltage in the radial position of a magnetic disk for writing. In the case of random recording mode, the writing position (zone) changes at random. A sampling frequency is changed based on the radial position of the change place of writing. For this reason, it is necessary to control bias voltage according to the change of a writing position. In the second embodiment, a bias voltage is controlled in accordance with the radial position of a magnetic disk for writing. This bias voltage control will be described.

In the bias control according to the second embodiment, as shown in FIG. 3, the SoC unit 500 transfers the setting information of recording data write position (the radial position of a magnetic disk) to the STO bias voltage controller 402 and the STO bias polarity controller 403. The STO bias voltage controller 402 changes a bias voltage to be applied to the STO 65 in the magnetic head 16, based upon the bias voltage setting table 301 stored in the memory unit 300 in accordance with the setting information of the transferred disk radial position. Similarly, the STO bias polarity controller 403 changes the polarity of a bias voltage to be applied to the STO 65 in the magnetic head 16, based upon the bias polarity setting table 302 stored in the memory unit 300 in accordance with the setting information of the transferred disk radial position.

In the case of data recording, the STO bias voltage is controlled as shown in FIG. 10. First, in the preamplification unit 400, when direction of data recording start are received (step S21), the preamplification unit 400 receives write disk radial position setting information to be generated when recording data is generated, from the SoC unit 500 and transfers it to the STO bias voltage controller 402 and STO bias polarity controller 403 (step S22). Upon receiving the disk radial position setting information, the STO bias voltage controller 402 refers to the STO bias voltage setting table 301 (step S23), reads out an STO bias voltage corresponding to the disk radial position of recording data, and controls the STO bias voltage application circuit 82 to change the STO bias voltage (step S24). Similarly, upon receiving the disk radial position setting information, the STO bias polarity controller 403 refers to the STO bias polarity setting table 302 (step S25), reads out polarity of the STO bias voltage corresponding to the disk radial position of recording data, and controls the STO bias voltage application circuit 82 to change the STO bias voltage of the polarity (step S26). After that, a series of processes is repeated until data recording is completed (step S27). Therefore, under the condition of a high data sampling frequency at which an inhibition influence is easily caused on an adjacent track due to the oscillation responsiveness of the STO 65, the STO bias voltage can be optimized and accordingly the inhibition influence can be reduced.

Below is one example of STO bias control in the second embodiment.

In FIG. 11, characteristics (a) to (c) each represent an example of setting an STO bias voltage to the disk radial position. As described above, an inhibition influence is caused due to oscillation responsiveness as the disk radial position is made closer to the outer circumference. It is thus desirable to suppress the STO bias voltage as the disk radial position is made closer to the outer circumference. As a method for the suppression, for example, it is considered that the bias voltage is lowered uniquely relative to the reference bias as the disk radial position is made closer to the outer circumference, as represented as, e.g., characteristic (a) in FIG. 11.

On the other hand, it is considered that the above inhibition influence due to oscillation responsiveness is not caused unless the disk radial position is beyond a given one. It is thus considered that in a frequency domain of a predetermined frequency (threshold value Rth-b) or higher as represented as, e.g., characteristic (b) in FIG. 11, the bias voltage is lowered uniquely relative to the reference bias in accordance with the frequency. When the inhibition influence due to oscillation responsiveness is great to the contrary, it may be desirable not to apply a bias voltage when the frequency is a given frequency (threshold value Rth-c) or higher. It is thus considered that the bias voltage is lowered uniquely relative to the reference bias in accordance with the frequency in a disk radial domain of threshold value Rth-c or lower as represented as characteristic (c) in FIG. 11 and the application of the bias voltage is turned off in a disk radial domain of threshold value Rth-c or higher.

As in the first embodiment, the reference bias is defined as a bias voltage value obtained when, for example, the difference absolute value delta R has reached 90% of the maximum value thereof or a bias voltage value obtained when, for example, the delta OW has reached 90% of the maximum value thereof.

A specific assumed range of the foregoing frequency threshold values Rth-b and Rth-c is inferred from the results of recording density improvement rate with respect to the disk radial position at the time of application of a predetermined STO bias voltage. The inhibition influence on an adjacent track due to responsiveness of the STO tends to deteriorate the recording density improvement rate as the disk radial position is made closer to the outside. Considering a disk radial position at which the improvement rate is less than 0% and the recording density is lowered, the voltage switching position has only to fall within an area with a disk radius of 27 mm or larger and 54 mm or smaller. This radius position is thus defined as the foregoing threshold values Rth-b and Rth-c.

As described above, the STO bias voltage is adjusted according to the write disk radial position to make it possible to reduce the inhibition influence due to responsiveness of the STO. It is effective to adjust the STO bias voltage to suppress the peak value of the recording current according to the disk radial position and lengthen the rise time of the recording current according to the disk radial position.

As described above, in the magnetic disk device according to the second embodiment, in the outer circumference of the disk radial position where the inhibition influence on an adjacent track due to STO oscillation responsiveness is easy to occur, the setting of the STO bias voltage can be optimized and thus the inhibition influence can be reduced.

Third Embodiment

Figure 12:
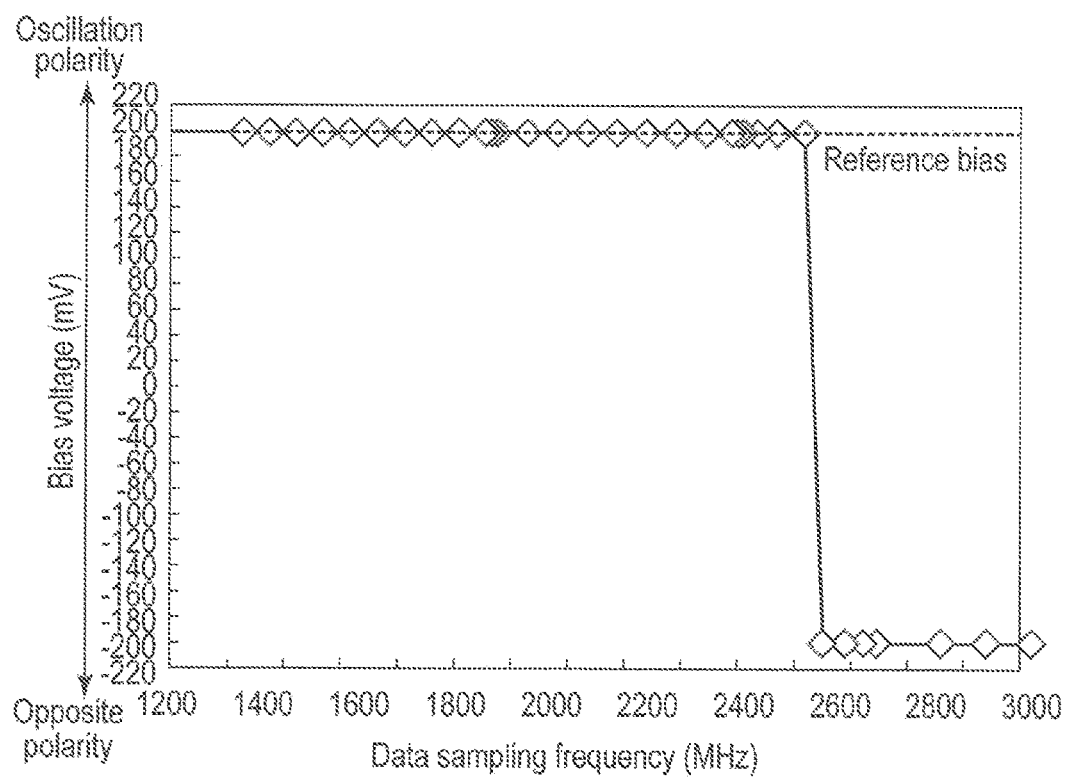
FIG. 12 is a characteristic graph showing an example of setting the polarity of an STO bias voltage corresponding to a data sampling frequency in a third embodiment.

In the first and second embodiments, the STO bias voltage is controlled based upon a data sampling frequency or a disk radial position corresponding to the data sampling frequency. Furthermore, the inhibition influence due to oscillation responsiveness of the STO can be improved even by controlling the polarity of the STO bias voltage by the STO bias polarity setting table 302 and STO bias polarity controller 403 shown in FIG. 3. In other words, when the data sampling frequency is a polarity switching threshold value or higher, the energizing polarity of the STO bias is switched to the polarity opposite to the direction in which the STO oscillates. This situation is shown in FIG. 12. The polarity switching threshold value can be set to 1880 MHz or larger and 3230 MHz or smaller.

Figure 13:
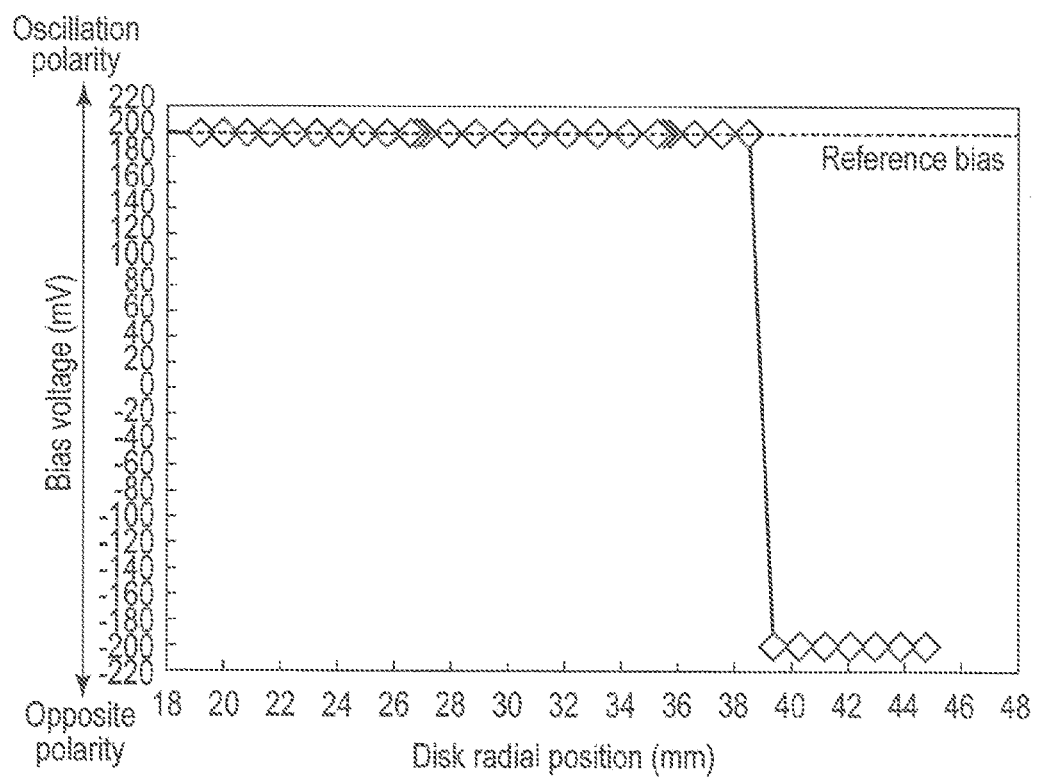
FIG. 13 is a characteristic graph showing an example of setting the polarity of an STO bias voltage corresponding to the radial position of a write disk in the third embodiment.

The polarity of the STO bias voltage can be switched in accordance with the radial position of a disk on which data is recorded. When the disk radial position is outside the polarity switching position, the energizing polarity of the STO bias is switched to the polarity opposite to a direction in which the STO oscillates. This situation is shown in FIG. 13. The polarity switching position can be set to an area with a disk radius of 27 mm or larger and 54 mm or smaller.

Fourth Embodiment

The fourth embodiment is directed to a technique of optimizing recording current when an STO bias voltage is adjusted in order to prevent adjacent track data quality deterioration due to STO oscillation responsiveness further at the time of recording of data with a high data sampling frequency. FIG. 14A shows recording current dependency on bit error rate at the time of application of a reference bias voltage. The recording current (reference recording current) at the time of recording data is set based upon the condition that a bit error rate has reached a threshold value when the threshold value is, for example, 98% of the absolute value thereof. On the other hand, when a bias voltage is lowered from the reference bias voltage in accordance with the data sampling frequency as shown in FIG. 14B, the rising of a bit error rate becomes late as the recording current increases. This causes the problem of deteriorating on-track properties slightly with the set reference recording current unchanged. To lower the bias voltage, it is desirable to confirm a recording current value that reaches a threshold value and set it higher than the reference recording current when necessary. To lower the bias voltage relative to the reference bias in accordance with the data sampling frequency and reduce the influence of STO oscillation, the recording current is also adjusted to be higher than the reference recording current. It is thus possible to prevent the interference with an adjacent track and maintain the on-track quality as much as possible.

In the foregoing description, the bias voltage is controlled in accordance with the data sampling frequency to adjust the recording current. The same holds true for the case where the bias voltage is controlled in accordance with the write disk radial position.

As described above, the magnetic disk device according to the fourth embodiment makes it possible to prevent an adjacent track signal quality deterioration due to STO oscillation responsiveness and improve the signal quality and the recording density.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
   a magnetic disk including a recording layer;
   a recording head configured to apply a recording magnetic field to the recording layer; and
   a controller configured to control the recording head, wherein
   the recording head includes:
      a main magnetic pole configured to generate the recording magnetic field;
      a return magnetic pole opposed to a tip portion of the main magnetic pole with a write gap therebetween and configured to form a magnetic circuit together with the main magnetic pole by returning magnetic flux from the main magnetic pole;
      a recording coil configured to excite magnetic flux in a magnetic circuit formed by the main magnetic pole and the return magnetic pole;
      a high-frequency oscillator disposed in the write gap; and
      a bias voltage application circuit configured to apply a bias voltage to the high-frequency oscillator through the main magnetic pole and the return magnetic pole, and
   the controller includes a bias voltage controller configured to change a bias voltage to be applied to the high-frequency oscillator in accordance with a sampling frequency of data before the data is recorded on the magnetic disk by the recording head.

2. The magnetic disk device of claim 1, wherein the bias voltage controller controls the bias voltage to lower relative to a reference bias as the sampling frequency increases.

3. The magnetic disk device of claim 1, wherein the bias voltage controller controls the bias voltage to lower relative to a reference bias or turn off when the sampling frequency is a voltage switching threshold value or higher.

4. The magnetic disk device of claim 3, wherein the bias voltage controller sets the voltage switching threshold value to 1880 MHz or higher and 3230 MHz or lower.

5. The magnetic disk device of claim 1, wherein:
the controller further includes a bias polarity controller configured to control polarity of a bias voltage to be applied to the high-frequency oscillator in accordance with a sampling frequency of data when the data is recorded on the magnetic disk by the recording head; and
the bias polarity controller switches energizing polarity of the bias voltage to polarity opposite to a direction in which the high-frequency oscillator oscillates when the sampling frequency is a polarity switching threshold value or higher.

6. The magnetic disk device of claim 5, wherein the bias polarity controller sets the polarity switching threshold value to 1880 MHz or higher and 3230 MHz or lower.

7. The magnetic disk device of claim 1, wherein the controller further includes a recording current controller configured to control recording current to be supplied to the recording coil in accordance with a sampling frequency of data when the data is recorded on the magnetic disk by the recording head.

8. The magnetic disk device of claim 7, wherein the recording current controller controls the recording current to lower peak intensity of the recording current as the sampling frequency increases.

9. The magnetic disk device of claim 7, wherein the recording current controller controls the recording current to lengthen rise time of the recording current as the sampling frequency increases.

10. The magnetic disk device of claim 7, wherein:
the bias voltage controller controls the bias voltage to lower relative to a reference bias as the sampling frequency increases; and
the recording current controller controls the recording current to lower peak intensity of the recording current relative to peak intensity of a reference recording current as the sampling frequency increases.

11. A magnetic disk device comprising:
a magnetic disk including a recording layer;
a recording head configured to apply a recording magnetic field to the recording layer; and
a controller configured to control the recording head, wherein
the recording head includes:
  a main magnetic pole configured to generate the recording magnetic field;
  a return magnetic pole opposed to a tip portion of the main magnetic pole with a write gap therebetween and configured to form a magnetic circuit together with the main magnetic pole by returning magnetic flux from the main magnetic pole;
  a recording coil configured to excite magnetic flux in the magnetic circuit formed by the main magnetic pole and the return magnetic pole;
  a high-frequency oscillator disposed in the write gap; and
  a bias voltage application circuit configured to apply a bias voltage to the high-frequency oscillator through the main magnetic pole and the return magnetic pole, and
the controller includes a bias voltage controller configured to change the bias voltage in accordance with a radial position of the magnetic disk on which data is recorded, before the data is recorded on the magnetic disk by the recording head.

12. The magnetic disk device of claim 11, wherein the bias voltage controller controls the bias voltage to lower relative to a reference bias as the radial position of the magnetic disk on which the data is recorded is made closer to an outer circumference.

13. The magnetic disk device of claim 11, wherein the bias voltage controller controls the bias voltage to lower relative to a reference bias or turn off when the radial position of the magnetic disk on which the data is recorded is outside a voltage switching position.

14. The magnetic disk device of claim 13, wherein the bias voltage controller sets the voltage switching position to fall within an area corresponding to a radius of 27 mm or larger and 54 mm or smaller of the magnetic disk.

15. The magnetic disk device of claim 11, wherein:
the controller further includes a bias polarity controller configured to control polarity of a bias voltage to be applied to the high-frequency oscillator in accordance with in accordance with the radial position of the magnetic disk on which data is recorded, when the data is recorded on the magnetic disk by the recording head; and
the bias polarity controller switches energizing polarity of the bias voltage to polarity opposite to a direction in which the high-frequency oscillator oscillates when the radial position of the magnetic disk on which data is recorded is outside a polarity switching position.

16. The magnetic disk device of claim 11, wherein the bias polarity controller sets the polarity switching position to 27 mm or larger and 54 mm or smaller of a radius of the magnetic disk.

17. The magnetic disk device of claim 11, wherein the controller further includes a recording current controller configured to control recording current to be supplied to the recording coil in accordance with the radial position of the magnetic disk on which the data is recorded, when the data is recorded on the magnetic disk by the recording head.

18. The magnetic disk device of claim 17, wherein the recording current controller controls the recording current to lower peak intensity of the recording current as the radial position of the magnetic disk on which the data is recorded is made closer to an outer circumference.

19. The magnetic disk device of claim 17, wherein the recording current controller controls the recording current to lengthen rise time of the recording current as the radial position of the magnetic disk on which the data is recorded is made closer to an outer circumference.

20. The magnetic disk device of claim 17, wherein:
the bias voltage controller controls the bias voltage to lower relative to a reference bias as the radial position of the magnetic disk on which the data is recorded is made closer to an outer circumference; and
the recording current controller controls the recording current to lower peak intensity of the recording current relative to peak intensity of a reference recording current as the radial position of the magnetic disk on which the data is recorded is made closer to an outer circumference.

\* \* \* \* \*